United States Patent
Neystadt et al.

(10) Patent No.: US 9,870,424 B2
(45) Date of Patent: Jan. 16, 2018

(54) SOCIAL NETWORK BASED CONTEXTUAL RANKING

(75) Inventors: Eugene (John) Neystadt, Kfar-Saba (IL); Ron Karidi, Herzeliya (IL); Yitzhak Tzahi Weisfeild, Hod Hasharon (IL); Roy Varshavsky, Even Yehuda (IL); Avigad Oron, Tel Aviv (IL); Kira Radinsky, Zichron Yaakov (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 13/042,460

(22) Filed: Mar. 8, 2011

(65) Prior Publication Data
US 2012/0209832 A1    Aug. 16, 2012

Related U.S. Application Data

(60) Provisional application No. 61/441,542, filed on Feb. 10, 2011.

(51) Int. Cl.
G06Q 30/02 (2012.01)
G06Q 10/10 (2012.01)
G06F 17/30 (2006.01)
G06Q 50/00 (2012.01)

(52) U.S. Cl.
CPC ... *G06F 17/30867* (2013.01); *G06Q 30/0282* (2013.01); *G06Q 50/01* (2013.01)

(58) Field of Classification Search
CPC .......................... G06Q 50/01; G06Q 30/0282
USPC .................................................. 705/1.1–912
See application file for complete search history.

(56) References Cited

U.S. PATENT DOCUMENTS

| | | | |
|---|---|---|---|
| 7,711,684 B2 | 5/2010 | Sundaresan et al. | |
| 2005/0159970 A1* | 7/2005 | Buyukkokten | G06Q 30/02 705/319 |
| 2006/0242554 A1* | 10/2006 | Gerace | G06F 17/30867 715/209 |
| 2007/0143281 A1* | 6/2007 | Smirin et al. | 707/5 |
| 2007/0198510 A1* | 8/2007 | Ebanks | G06Q 30/02 |
| 2008/0033959 A1* | 2/2008 | Jones | 707/9 |
| 2008/0294637 A1 | 11/2008 | Liu | |

(Continued)

FOREIGN PATENT DOCUMENTS

| | | |
|---|---|---|
| CN | 101236624 A | 8/2008 |
| CN | 101501672 A | 8/2009 |

(Continued)

OTHER PUBLICATIONS

Solis, Brian, "The rapid evolution of search," wwwbriansoliscom, Nov. 10, 2009.*

(Continued)

*Primary Examiner* — Jonathan Ouellette
(74) *Attorney, Agent, or Firm* — International IP Law Group, PLLC

(57) ABSTRACT

A ranked set of users may be calculated from an expertise categorization for each user and a person's trust in the users for specific categories. The ranked set of users may be used for presenting search results, recommendations, social marketing, or other uses. A person's reputation may be determined through various online activities. A person's trust in another person may be related to their proximity and activity in one or more social networks.

20 Claims, 4 Drawing Sheets

(56) References Cited

U.S. PATENT DOCUMENTS

| | | | |
|---|---|---|---|
| 2009/0037412 A1* | 2/2009 | Bard et al. | 707/5 |
| 2009/0055435 A1* | 2/2009 | Kiviluoto | G06Q 30/02 |
| 2009/0070130 A1 | 3/2009 | Sundaresan et al. | |
| 2009/0144259 A1* | 6/2009 | Sundaresan | G06F 17/30648 |
| 2010/0070554 A1* | 3/2010 | Richardson et al. | 709/202 |
| 2010/0082593 A1 | 4/2010 | Singh | |
| 2010/0250605 A1* | 9/2010 | Pamu et al. | 707/783 |
| 2010/0257183 A1 | 10/2010 | Kim et al. | |
| 2011/0010366 A1* | 1/2011 | Varshavsky et al. | 707/732 |
| 2011/0225140 A1* | 9/2011 | Wu | 707/709 |
| 2011/0252015 A1* | 10/2011 | Bard et al. | 707/706 |
| 2012/0116905 A1* | 5/2012 | Futty et al. | 705/26.1 |
| 2012/0143862 A1* | 6/2012 | Jones | 707/732 |
| 2012/0158611 A1* | 6/2012 | Pulito et al. | 705/347 |
| 2012/0158844 A1* | 6/2012 | Pulito et al. | 709/204 |
| 2012/0179552 A1* | 7/2012 | Tishkevich | 705/14.66 |

FOREIGN PATENT DOCUMENTS

| | | |
|---|---|---|
| CN | 101547274 A | 9/2009 |
| CN | 101548274 A | 9/2009 |
| CN | 101770487 A | 7/2010 |
| CN | 101843041 A | 9/2010 |
| KR | 1020080017685 A | 2/2008 |
| KR | 1020100006752 A | 1/2010 |
| WO | 2010123264 A2 | 10/2010 |

OTHER PUBLICATIONS

"International Search Report", dated Sep. 24, 2012, Application No. PCT/US2012/024550, Filed Date: Feb. 9, 2012, pp. 9.

Han, et al., "Evaluation of User Reputation on YouTube", Retrieved at << http://nlp.changwon.ac.kr/attach/papers/2009HCII_EMMOUS.pdf >>, Proceedings of the 3d International Conference on Online Communities and Social Computing: Held as Part of HCI International, 2009, pp. 8.

Cha, et al., "User Reputation Evaluation Using Co-occurrence Feature and Collective Intelligence", Retrieved at << http://nlp.changwon.ac.kr/attach/papers/2009HCII_JCHA.pdf >>, Proceedings of the 3d International Conference on Online Communities and Social Computing: Held as Part of HCI International, 2009, pp. 8.

Bao, et al., "Optimizing Web Search Using Social Annotations", Retrieved at << http://citeseerx.ist.psu.edu/viewdoc/download-?doi=10.1.1.74.3168&rep=rep1&type=pdf >>, 16th International World Wide Web Conference, May 8-12, 2007, p. 501-510.

"How to implement a reputation system like Stack Overflow?", Retrieved at << http://stackoverflow.com/questions/735168/how-to-implement-a-reputation-system-like-stack-overflow >>, retrieved Date: Dec. 13, 2010, pp. 4.

Kleinberg, Jon M., "Authoritative Sources in a Hyperlinked Environment", Retrieved at << http://www.cs.cornell.edu/home/kleinber/auth.pdf >>, Proceedings of the ACM-SIAM Symposium on Discrete Algorithms, 1998, pp. 34.

Rozenfeld, et al., "Consistent Continuous Trust-Based Recommendation Systems", Retrieved at << http://www.technion.ac.il/~olga/recs_website.pdf >>, Proceedings of the 5th International Workshop on Internet and Network Economics, 2009, pp. 22.

Altman, et al., "An Axiomatic Approach to Personalized Ranking Systems", Retrieved at << http://www.aaai.org/Papers/IJCAI/2007/IJCAI07-192.pdf >>, Proceedings of the 20th international joint conference on Artifical intelligence, 2007, pp. 1187-1192.

Wu, et al., "Propagating Trust and Distrust to Demote Web Spam", Retrieved at << http://www.cse.lehigh.edu/~brian/pubs/2006/MTW/propagating-trust.pdf >>, 2006, pp. 9.

Sarma, et al., "Ranking Mechanisms in Twitter-like Forums", Retrieved at << http://research.yahoo.com/files/wsdm357-dassarma.pdf >>, Third ACM International Conference on Web Search and Data Mining, Feb. 3-6, 2010, pp. 10.

Radinsky, et al., "Market for Social Promotion of Digital Goods", U.S. Appl. No. 12/823,122, filed Jun. 25, 2010, pp. 23.

"The Future of Search: Exploring Society Related Ranking Algorithm", Published on: Jul. 7, 2009 Available at: http://tech.sina.com.cn/i/2009-7-17/14523273092.shtml.

"First Office Action Issued in Chinese Patent Application No. 201210029042.9", dated Oct. 8, 2014, 14 Pages.

"Second Office Action and Search Report Issued in Chinese Patent Application No. 201210029042.9", dated Apr. 17, 2015, 13 Pages.

"Fifth Office Action Issued in Chinese Patent Application No. 201210029042.9", dated Aug. 16, 2016, 7 Pages.

"Fourth Office Action Issued in Chinese Patent Application No. 201210029042.9", dated Mar. 15, 2016, 8 Pages "Third Office Action Issued in Chinese Patent Application No. 201210029042.9", dated Oct. 26, 2015, 11 Pages.

* cited by examiner

SOCIAL NETWORK BASED CONTEXTUAL RANKING

CROSS REFERENCE TO RELATED APPLICATIONS

This application claims the benefit of and priority to U.S. Provisional Patent Application Ser. No. 61/441,542 entitled "Social Network Based Contextual Ranking", filed 10 Feb. 2011 by John Neystadt, et al., the entire contents of which are hereby incorporated by reference for all they teach and contain.

BACKGROUND

Not everybody's opinion matters. Some people are more trusted than others, and some people have more expertise than others. Each person may be trusted differently by different people, and one person may be trusted by a first person but distrusted by a second person.

SUMMARY

A ranked set of people may be calculated from a reputation or influence rating for specific categories. The ranked set of people may be tailored for a specific user by selecting those people from a user's social network that have influence in a given category. The group of people may be ranked based on the user's trust in the people, as well as the people's expertise or influence in the category. The ranked set of people may be consumed by various applications that may personalize information based on the user's social network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
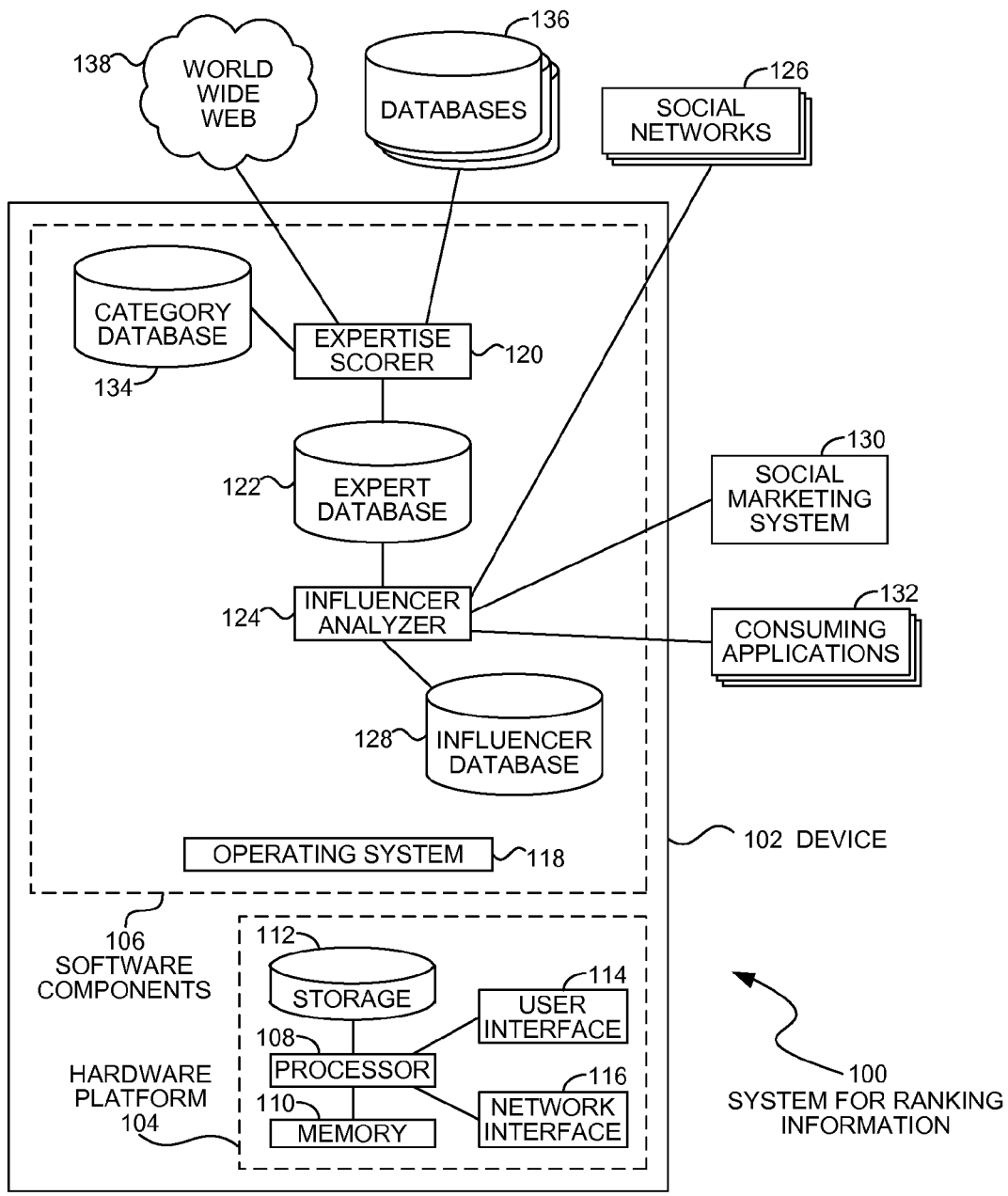
FIG. 1 is a diagram of an embodiment showing a network environment with a system or ranking information.

A system for evaluating and presenting information combines people's influence or reputation with a level of trust. A person's reputation or influence may be determined through the person's online presence, and the level of trust may be derived from a user's social network. For each person, their specific social network may cause the system to yield different, personalized results.

The system may create different results for different contexts or categories. Each context may be a different subject matter, use scenario, topic, or area for which the system may operate. Each person may have a reputation or expertise in different topics, each of which may be a different level of expertise. The system may return different results for a particular user based on the context of a query. For example, a query relating to photography may return a different ranked list of people than the same query but relating to nutrition. The differences may be in part related to the people's expertise or reputation in the various fields.

The ranked list of people may be used to find connections into a set of information objects. The information objects may be ranked according to the ranked list of people and presented to a user in some form. The information objects may be search results from a keyword search, documents from a document repository, reviews or other information about retail products for purchase, or any other type of information.

A use scenario may be to retrieve recommendations for the purchase of an item. The system may receive the query context and a user identification, then return a ranked list of persons based on the user's trust in people who wrote the reviews. An application may receive the ranked list, determine connections between the ranked list and product reviews, then present a list of reviews of the product that are organized according to the level of trust the user has in the people who created the reviews.

A person's reputation in a context may be determined through the person's online activity and reputation within the context. A person who has a high degree of activity in the context and/or enjoys a quality reputation in the context can be considered an influencer in the field. The person's activity may be determined through many different online activities, including blog postings, comments left on other blogs, activity on public forums, conference attendance, and other public activities. In cases where a person's permission is obtained, the person's activities may be determined through private correspondence, including email communications, instant messages, or other information.

People may have different types of influence or reputation. In some cases, a person may have a high level of expertise in a category. In other cases, a person may communicate with or otherwise influence other people on the same category without having a measurable level of expertise. Some embodiments may use one or both types of influencers to determine a ranking.

Throughout this specification, the terms "user" and "person" or "people" are used in a specific manner. The term "user" relates to the person at the center of the social network. The user is the one for whom a ranked list may be generated, whereas the "people" are other people that may or may not be in the user's social network. The terms are used to help identify the user for whom any customization may be performed.

For the purposes of this specification and claims, the term "person" or "user" may refer to both natural people and other entities that operate as a "person". A non-natural person may be a corporation, organization, enterprise, team, or other group of natural people.

For the purposes of this specification and claims, the term "social network" or "online social network" may relate to any type of computerized mechanism through which persons may connect or communicate with each other. Some social networks may be formal systems that facilitate end-to-end communications between people in a social network. Other social networks may be less formal, and may consist of a person's email contact list, phone list, mailing list, or other database from which a person may initiate or receive communication. In some embodiments, a social network may be inferred from a call log, instant messaging log, email log, or any other communications between people. In many cases, the social network may be inferred without examining or identifying the content of the communications between people.

In some cases, a social network may facilitate one-way relationships. In such a social network, a first person may establish a relationship with a second person without having the second person's permission or even making the second person aware of the relationship. A simple example may be an informal email contact list where a person may store contact information for other people. Another example may be a social network where a first person "follows" a second person to receive content from the second person or where the person subscribes to a syndicated feed. The second person may or may not be made aware of the relationship.

In some cases, a social network may facilitate two-way relationships. In such a social network, a first person may request a relationship with a second person and the second person may approve or acknowledge the relationship so that the two-way relationship may be established. In some social networks, each relationship within the social network may be a two-way relationship. Some social networks may support both one-way and two-way relationships.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing an environment in which a system may rank and present information. Embodiment 100 is a simplified example of a network environment in which a ranking system may operate with various social networks, the World Wide Web, and consuming applications.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a simplified system that may create customized or specific ranking of information based on relationships in a user's social networks. The system may identify experts or influencers in specific categories, and apply a user's specific trust factors from their social networks to determine a ranked list of people. The ranked list of people may be used to filter and sort information such as product reviews, web page search results, or other uses.

Influencers may be persons whose reputation and influence may be valued by the user. The influence may be based on the person's activities on the world wide web, various databases, as well as activities in various social network. For example, a person who writes articles for weblogs or other publications, or a person who comments or participates in online discussions may be considered to have expertise in certain categories or contexts. Various metric may include the number of publications on the topic, the frequency of publication, the frequency of publication compared to other people in the same or different categories, or other metrics.

Other metrics may include the importance or influence of the person's publications. The metrics may include how many times the person's works are referenced, how many subscribers may receive the person's works, the number of page views for the person's works, feedback or comments regarding the person's works, or other types of metrics.

The person's publications may be publically available publications, such as weblog postings, comments, or participation in public forums. In some embodiments, the person's publications may be private or semi-private publications, such as email messages, instant messenger messages, message transmitted within the confines of a social network, or other such messages.

In some embodiments, a person may authorize or permit access for an evaluation system to determine the person's influence or reputation. In such embodiments, a person may sign up for an evaluation of the person's relative expertise in various categories, and the system may provide credentials, offers, or other items in exchange as an enticement for the analysis.

In systems that may access information that may be considered private to the person, the person may have to expressly authorize the system to access such information. Without such access, the system may be limited to analyzing publically available information to determine a person's reputation.

A person may also have influence through their social network activities. A person who is actively involved in social networking may have more influence than people who are not involved.

Various metrics from a social network may imply a person's reputation or influence. The sheer number of relationships may be a factor, and some embodiments may analyze the type or nature of the relationships. Such embodiments may identify relationships between experts in a field as an indicator that the person may also be an expert. Such embodiments may, for example, analyze the frequency that two people interact as an indicator of the strength of the relationship. In some embodiments, two people may enjoy multiple relationships through multiple channels. In such embodiments, the duplicative nature of the relationships may indicate a strong relationship.

For many applications, the actual propagation of a person's content or opinion through a chain of people may be a strong indicator of a person's influence. An example may be a success rate or conversion rate of a person's offers to other people, such as when the person offered a discount coupon or recommended a website, game, or other item to people in their social network. The conversion rate may strongly correlate to the person's influence.

In some instances, a person's comments or publications may start or may be part of a larger conversation across multiple weblogs, chat rooms, social networks, or other methods of communication. In such a case, the person's comments may be tracked or analyzed to determine what influence, if any, the person's comments had in the overall conversation. A person who produces commentary on a topic early and frequently in a long conversation may be considered to have a higher reputation and influence that someone who comments later in the conversation.

Embodiment 100 is an example of a ranking service that may identify a ranked list of persons that may be consumed by one or more consuming applications. Embodiment 100 is a simplified example of an architecture where all of the ranking service components operate on a single hardware platform, such as a server computer. Other embodiments may deploy the various components on multiple hardware platforms that may operate in parallel to provide the ranking service at much higher volumes than a single server could provide. In some such embodiments, each component of the ranking service may operate on one or more hardware platforms.

The device 102 may have a set of hardware components 104 and software components 106. The client device 102 may represent any type of device that may communicate with a consuming application 132 as well as the World Wide Web 138 and other components.

The hardware components 104 may represent a typical architecture of a computing device, such as a desktop or server computer. In some embodiments, the client device 102 may be a personal computer, game console, network appliance, interactive kiosk, or other device. The client device 102 may also be a portable device, such as a laptop computer, netbook computer, personal digital assistant, mobile telephone, or other mobile device.

The hardware components 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware components 104 may also include one or more user interface devices 114 and network interfaces 116. The user interface devices 114 may include monitors, displays, keyboards, pointing devices, and any other type of user interface device. The network interfaces 116 may include hardwired and wireless interfaces through which the device 102 may communicate with other devices.

The software components 106 may include an operating system 118 on which various applications may execute.

A reputation scorer 120 may analyze content from the World Wide Web 138, various databases 136, or other sources to generate a reputation database 122. The reputation scorer 120 may crawl the World Wide Web 138 or any other source to identify persons who have some connection to one of the categories in a category database 134. The documents or activities of those persons may be analyzed by the reputation scorer 120 to determine if the persons meet some criteria for expertise in the category and may be added to an reputation database 122.

The category database 134 may be a set of categories, topics, areas of interest, or other contexts for which an application may request a ranked list of people. In some embodiments, the category database 134 may be a hierarchical structure of topics. Other embodiments may use various graphs or other organizations to structure the categories.

In embodiments where the category database 134 has structure and relationships between categories, a person's reputation in a category close to a given category may be considered, even if the person does not have a reputation in precisely the same category as the one requested. In some embodiments, the reputation may be adjusted to apply to other categories that may be close to the primary category for the person.

An influencer analyzer 124 may assign an influencer score for each of the people in the reputation database 122 and create entries in an influencer database 136 for those persons who exhibit qualities of an influencer. In some embodiments, the influencer analyzer 124 may also add persons who exhibit influencer characteristics in social networks 126 who may not be considered experts in a specific category.

The influencer analyzer 124 may analyze the person's activities in various formal and informal social networks to determine whether or not the person actually influences others or could influence others. The influencer analyzer may examine the size of a person's social network and the extent to which the person uses the social network as indicators of influence. Some embodiments may examine the content and frequency of a person's activities to infer a level of influence.

Some embodiments may search for prior acts of influence. A prior act of influence may be when a first user sends an invitation to perform an action, such as purchase a product or join a group, and when other users accept the invitation and perform the action. Some social marketing systems 130 may track such activities, and such activities may be uncovered through analyzing the person's activities and people's responses through formal or informal social networks 126.

In some embodiments, the influence analyzer 124 may be capable of tracing communication between users across different social networks. For example, a person may post an invitation on a weblog that may be downloaded by a second person, passed by email to a third person, who posts the invitation on a social network site to be redeemed by a fourth person. Such embodiments may be capable of detecting some or all of the various transactions to identify influential people.

The reputation scorer 120 and influence analyzer 124 may have sets of heuristics, algorithms, or other mechanisms for analyzing a person's reputation or influence, respectively. In some embodiments, an reputation scorer 120 or an influence analyzer 124 may have multiple analysis routines, each of which may attempt to identify a specific type of influence. For example, one analysis routine may attempt to determine the number of social network connections while another analysis routine may attempt to determine the number of communications on a given category. Each analysis routine may generate a 'score' that may be aggregated to determine an overall score for reputation or influence.

In such an embodiment, the various analysis routines may be operated independently of each other and may provide analyses from different aspects of a person's influence. In some embodiments, two or more analysis routines may be arranged in series where the output of one or more analysis routines may be used as input to another analysis routine.

In one embodiment, a person's influence may be determined through explicit voting by the user or other persons about the person's activities, such as voting or sentiment analysis on weblog postings, comments, or other activities for which feedback may be collected.

The influencer analyzer 124 may be capable of responding to various consuming applications 132 and may provide a ranked list of people that are found within a user's social network. The influencer analyzer 124 may provide a list of influencers that are ranked in order of influence with respect to a specific user. The highest ranked person may be a person in whom the user has a strong relationship and has a high influence score. The influence score may be a general influence score that may be modified by a trust score derived from the user's social network.

The ranked list of persons may indicate the people within a user's social network that the user trusts or is likely to trust. The ranked list may be consumed by various consuming applications 132 for various use scenarios.

In one use scenario, a user may be browsing an online retail store. While browsing to a specific camera, the system of embodiment 100 may be queried to return a ranked list of people within the user's social network who have commented or reviewed the specific camera. The ranking may be customized to the user and may show only those reviews that are likely to be trusted by the user.

When the ranked list may be used to show various information items, such as product reviews, a connection may be identified between the people in the ranked list and the items such as the product reviews. Those items with a connection may be sorted by the ranking and presented to the user.

In another use scenario, a user may be searching the World Wide Web for some information. A search engine may gather some search results, but may filter and organize the search results with the ranked list of people to present results that are customized or relevant to the user.

The search results may be customized for a particular user by identifying connections between the people in the ranked list and the items in the search result. Those items not having connections to items in the ranked list may be filtered out, then organized using the ranking from the list.

In some uses of the ranked list, the items being filtered and ranked may by themselves have a ranking associated with them. For example, search results from a search engine typically have a search ranking factor. The ranked list may also have a ranking factor. In such cases, a unified score may be created by aggregating the two ranking factors by addition, multiplication, or some other algorithm or heuristic. In still another use scenario, a user may search a document repository, such as a shared workspace or a social network forum that may contain many thousands of documents. The search system may customize a search in the document repository with filtered and ranked results from people related to and trusted by the user.

In such a use scenario, the documents may be filtered to include only those documents associated with people in a user's social network. The documents may then be ranked using the ranked list and presented to the user.

In yet another use scenario, a user may wish to browse a movie database in order to select a movie to view. A ranked list of people within the user's social network may be received and connections established between the people on the list and their corresponding movie choices. The movie choices for each person may be determined through collaborative filtering based on the people's likes and dislikes for various movies. The ranked list may be used to aggregate and sort the preferred movies for each of the people in the user's social network and present some suggested movies to the user.

The embodiment 100 illustrates a system where the reputation database 122 and influencer database 128 may be created prior to receiving a request from a consuming application 132. Other embodiments may operate by generating the ranked list on the fly or on demand by searching the World Wide Web 138, databases 136, or other sources of information for each person in a user's social network.

In order to determine a ranked list of persons on demand, a search may be for persons who have some reputation or social network activity relating to a specific category. The persons identified during the search may be classified according to the influencer score and the relationships to the user may be given a trust score. The combined influencer score and trust score may be used to generate the ranked list of persons.

Figure 2:
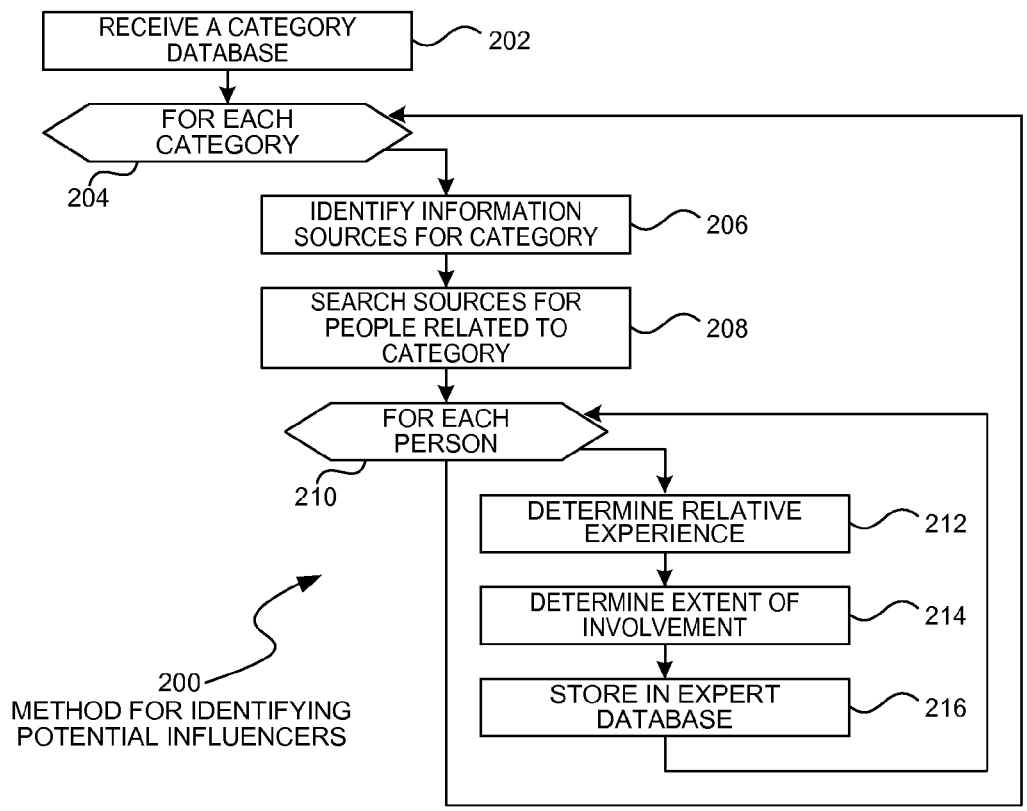
FIG. 2 is a flowchart of an embodiment showing a method for identifying potential influencers.

FIG. 2 is a flowchart illustration of an embodiment 200 showing a method for identifying potential people with a reputation in certain categories. Embodiment 200 is a simplified example of a method that may be performed by a reputation scorer, such as the reputation scorer 120 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a simplified example of a method by which experts may be identified and analyzed. The people may be identified and analyzed per category according to a category database. In many cases, a person's reputation in one category may be substantially different from the same person's reputation in another category.

For example, a person may be an expert in photography and may have weblog postings, social network interactions, and other items that may relate to photography. However, the same person may not have much involvement or interest in political matters. The person may be classified as having a strong reputation in the classification of photography but a weak or no reputation in politics.

There may be several types of people. In some cases, a person may be an expert on the basis of displayed knowledge in category. Such an expert may have a body of work, credentials, or other information that may imply the person's expertise in the field.

In other cases, a person with high reputation may be those people who successfully connect and communicate with other people. Such people may or may not have much expertise in a certain category, but may be successful in making contact with other people about the category and facilitating communication. In some cases, such people may be successful in establishing relationships between experts in the field and other people who wish to know more about a category. Other embodiments may determine expertise or reputation through other methods or analyses.

Embodiment 200 illustrates a method that may be performed prior to ranking people in a user's social network. The method of embodiment 200 may be performed as a background process any may create a database of people and assign various reputation levels and reputation scores for each category. Such an embodiment may generate and maintain a large database that may include people in any category found anywhere on the World Wide Web.

In some embodiments, some of the operations of embodiment 200 may be performed in response to a query. Such embodiments may be performed "on the fly" or "on demand" as opposed to a background process. Such embodiments may maintain a database of people that are analyzed whenever a new request is received. Such embodiments may only analyze a set of people taken from a user's social network or for a small number of categories.

A category database may be received in block 202. The category database may be a list of topics, hierarchical database of categories, graph of related areas of interest, or some other database or organization of categories.

For each category in block 204, a set of information sources may be identified that are applicable to the category in block 206. The information sources may be databases, websites on the World Wide Web, or other repositories of information that may be pertinent to the specific category.

The information sources may be searched in block 208 to identify people related to the category.

For each person identified in block 210, the person's relative expertise may be determined in block 212 and the person's relative extent of involvement in the category may be determined in block 214. The person's profile may be stored in an reputation database in block 216.

A person may be considered as an 'expert' in a field by either or both of having displayed actual expertise or by being involved in the field. Such criteria may include both people who publish papers, weblog entries, comments, postings, or other information about a topic, as well as people who communicate about the category in general.

The extent of involvement in a category may be determined by a person's involvement in social networks and specifically their involvement regarding a specific category. A person who creates social media messages that relate to baseball, for example, may show their involvement in the category of baseball without showing much content that may indicate that the person is a traditional 'expert' in the field.

In some embodiments, a person's expertise may be increased or decreased based on positive or negative affiliations or feedback. Some such embodiments may update a person's expertise level over time.

Figure 3:
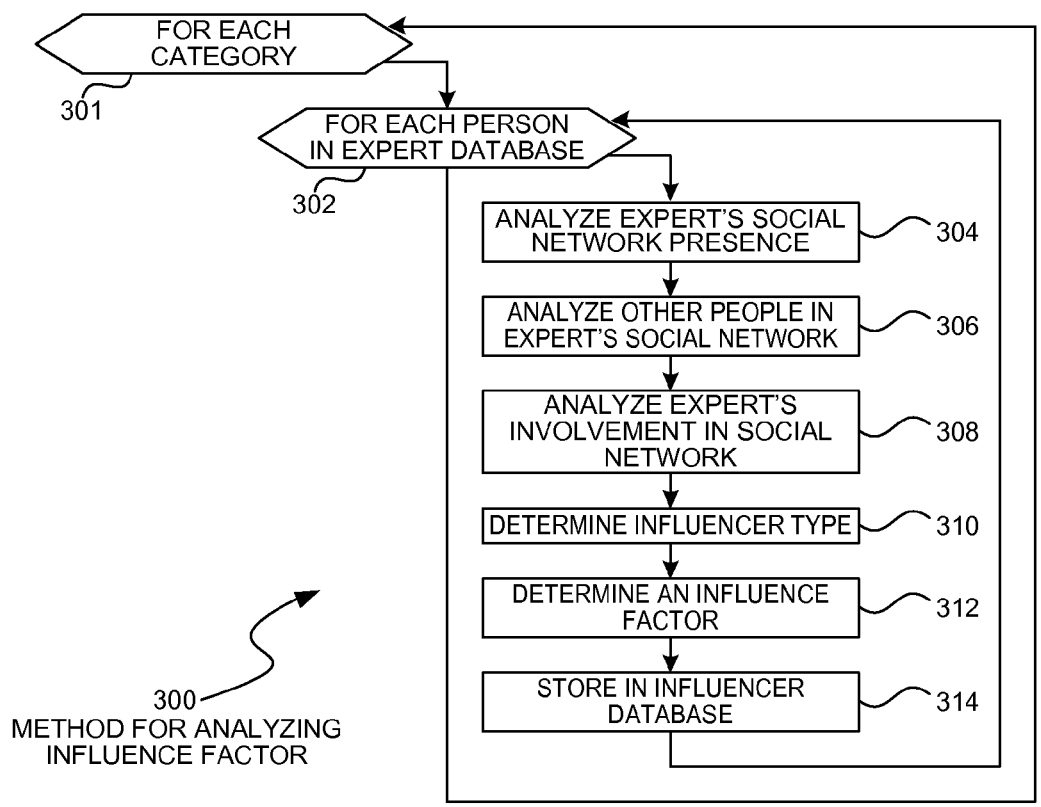
FIG. 3 is a flowchart of an embodiment showing a method for analyzing influence factors.

FIG. 3 is a flowchart illustration of an embodiment 300 showing a method for analyzing influencers. Embodiment 300 is a simplified example of a method that may be performed by an influence analyzer, such as the influence manager 124 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a simplified method by which a person may be analyzed and scored as an influencer. An influencer may be representation a person's previous or likely success at exerting influence over other people in a specific category. The concept of influence may be different from that of expertise or reputation in that influence represents a person's ability to operate within a social network in a particular category. In some cases, a person's reputation may increase their influence, but in other cases, a person may be an influencer without having high reputation.

The concept of influence may imply a degree of trust between people. The trust may be implied by expertise in a field, as well as through interactions in various formal or informal social networks. In some social networks, one person may be able to expressly declare a certain degree of trust in another person, however many social network may not have such a declaration.

A person's influence may be measured or implied by their presence and activities within various social networks. A person's presence in a social network, including how connected the person may be along with the nature of the connections, may imply the degree to which a person is influential. A person's involvement in the social network may be a measurable influence factor when the person's communications generate responses in other people.

Embodiment 300 illustrates a method that may be performed prior to ranking people in a user's social network. The method of embodiment 300 may be performed as a background process any may process the reputation database created in embodiment 200 to create an influencer database. Such an embodiment may generate and maintain a large database that may include any expert in any category found anywhere on the World Wide Web.

In some embodiments, some of the operations of embodiment 300 may be performed in response to a query. Such embodiments may be performed "on the fly" or "on demand" as opposed to a background process. Such embodiments may add the results of the analysis in to an influencer database as new requests are received. Such embodiments may only analyze a set of people taken from a user's social network or for a small number of categories.

In block 301, the process may be performed for each category. In many cases, a single person may be analyzed in different categories and be determined to be a different type or different degree of an influencer in several different categories.

Each person in the reputation database in block 302 may be analyzed. The reputation database as discussed in embodiment 200 may include both people with demonstrated interest or expertise in a category along with people who have actively communicated within a social network concerning the category.

In block 304, the person's social network presence may be analyzed. The person's social network may be considered by the number of connections within a person's social network, which may include the number of one-way and two-way relationships in both formal and informal social networks.

Some social networks allow a person to 'follow' or receive messages from another person. Such social networks may allow the receiving person to monitor the publishing person's activities and do not involve a two-way relationship to be formed. One example may be a social network where each user transmits a short message, such as a message of 140 characters, that may be received and viewed by whoever happens to be following the transmitting person. Another example may be a website, weblog, or application that may use RSS (Really Simple Syndication) or other publication technologies to transmit updates to various followers. Still other examples may include email distribution list subscribers or other distribution lists.

Another example of a one-way relationship in an informal social network may be through a person's contact list. Many people maintain lists of phone numbers, email addresses, postal addresses, instant messenger contacts, or other information about various people. Some people maintain lists of favorite websites, which may be formal lists where the person keeps a set of shortcuts to the websites, or informal lists such as a history of often-viewed websites.

Some formal social networks utilize two-way relationships. In a two-way relationship, both parties to a relationship acknowledge acceptance prior to forming the two-way relationship. In some such social networks, a one-way relationship may be established first with limited communication by a first party, then a full two-way relationship may be established when the second party accepts or acknowledges the relationship.

In some embodiments, a person may give permission to a system to analyze the person's influence. In such embodiments, the system may be given limited or full access to the person's social networks, both formal and informal, in order to evaluate the person's influence. In such embodiments where the person may not give permission, the system may still be able to perform an influence analysis but with publically available data.

In block 306, the other people in a person's social network may be analyzed. The nature of the people and the relationships within the social network may indicate the person's expertise and influence in a group.

Consider two example cases: in the first case, a published expert in photography may maintain many contacts with other experts in photography. In such an example, the person's reputation may be raised because of the technical contacts in the photography field but the person's influence in the social network may be minimal because the person may not enjoy 'expert' status in the eyes of the people in the network.

In another example case, the same expert in photography may have many contacts for people who are not experts in photography. In such an example, the person's expertise plus the difference in expertise between the person and other people in the social network may indicate that the person may be a greater influence in the category of photography, since the person has a superior knowledge base.

In block 308, the person's involvement in the social network may be analyzed. A person who is actively involved in various social networks, both formal and informal, may indicate the person's relative influence. For example, if a person has many contacts but seldom communicates with those contacts, the person's influence may be minimal. The more a person uses a specific social network, the person may be considered more influential in that social network.

The communications within the social network may be analyzed with respect to different categories. An expert in photography who actively discusses photography topics within the social network may be a high influencer in photography. A similar expert in photography who discusses politics or religion in the social networks may be considered to have much less influence in the social networks with respect to photography.

The person's effects of their actions in a social network may be analyzed in some embodiments. The effects of a person's email or weblog posting may be traced by how the recipients react to the person's actions. In some embodiments, the mere fact that someone responded to an email or commented on a weblog posting may be sufficient to establish the person as an influencer.

In other embodiments, the quality of the response may be considered. For example, a positive response may be treated differently than a negative or neutral response. Some social networks may have a mechanism for users to vote or indicate their approval of certain content. Such information may be used to determine the extent and quality of the influence a person may have exhibited.

In block 312, the type of influencer may be determined. In some embodiments, different influencer types may be identified. For example, a "maven" may be an influencer type that exhibits an expertise in a category and tends to spread the word about new developments in the category. In another example, a "connector" may be an influencer that may or may not exhibit expertise in a category, but facilitates communication about the category within the person's social network. A connector may be able to link a person seeking information with an expert or maven who may provide the information. In some embodiments, a person may act as one or more types of influencers for a given category.

An influencer factor may be determined in block 314. The influencer factor may be a rating that indicates the relative strength of the influencer within the category. In some embodiments, a person may be given different influencer strengths for each of the various influencer types.

Once the influencer types and strengths have been determined, the influencer may be stored in an influencer database in block 314. In many embodiments, a single person may have multiple entries that identify the person as an influencer in several different categories.

Figure 4:
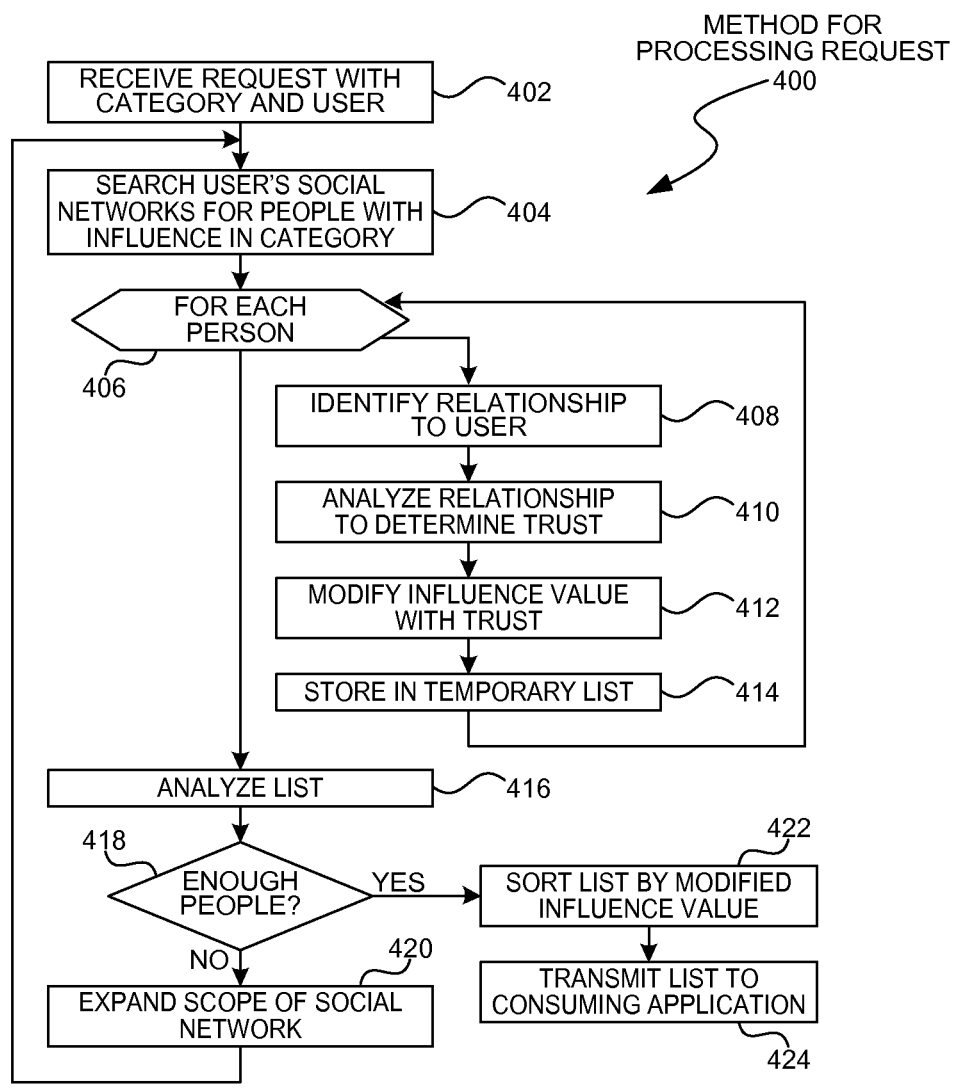
FIG. 4 is a flowchart of an embodiment showing a method for processing a request.

FIG. 4 is a flowchart illustration of an embodiment 400 showing a method for processing requests for ranked lists of people. Embodiment 400 is a simplified example of a method that may be performed by an influence analyzer, such as the influence manager 124 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 represents a simplified example of a method that generates a ranked list of people according to a user and category. The ranked list may be consumed by various applications, such as a search engines, retail sales sites, or other applications to present information to a specific user according to the user's contacts and trust in their social network.

In block 402, a request may be received with a category and a user identifier. The request may be for a ranked list of influencers that may have influence for a specific user. Each user may have different levels of trust and different relationships, so the ranked list may be different for each user.

The category definition in the request may identify the scope of the topics for which the request applies. In some cases, the category definition may be broad, such as the general topic of photography, while in other cases, the category definition may be more narrow, such as a specific brand and model of a digital camera.

Using the category and user identifier, the user's social networks may be searched for people who have influence in the category. Some embodiments may include a user's public and private social networks. When a user's private social networks are accessed, the user may give permission for the private social networks to be accessed.

Each person identified in block 404 may be analyzed in block 406. For each person, the relationship to the user may be identified in block 408. In some cases, two people may share relationships in two or more social networks.

The relationships may be analyzed in block 410 to determine a user's trust with the analyzed person. For example, a relationship that has endured for many years, such as classmates from grade school or family relationships may be considered to have a much higher degree of trust than other relationships. The user's trust may be implied from the frequency of communication with the analyzed person, the topics discussed in the communication, and any actions that the user performed in response to the person's actions.

The person's influence value that may have been determined in embodiment 300 may be modified by the trust factor for the specific relationship between the user and the person. In one embodiment, the trust factor and the influence factor may be multiplied and the product of the two factors may be used as a ranking value.

The ranking value may be stored in a temporary list in block 414.

After each person has been analyzed, the list of persons may be analyzed in block 416. The list may be analyzed to determine if the number of persons or the ranking values of the persons on the list meets a set of predefined criteria. If there are not enough people in block 418, the scope of the social network may be expanded in block 420 and another search may be performed in block 404.

In some embodiments, a search may be initially performed using a small scope of a social network. The initial search may be, for example, the direct relationships or first degree connections of the user. An iterative process may expand the search to include second and third degree connections of the user.

When multiple degrees of connection exist between the user and a person, the level of trust of the user to that person may be decreased because of the degrees of separation to the person.

If the list passes the analysis in block 418, the list may be sorted by the modified influence value also referred to as the ranking value in block 422 and the sorted list may be transmitted to the consuming application in block 424.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method implemented by an influence manager operating on at least one computer hardware platform, comprising:
    receiving a plurality of usage context;
    receiving a request comprising a first category and a first user;
    crawling a social network comprising said first user to identify a first set of persons having a reputation level associated with said first category;
    for each person in said first set of persons:
        determining by the influence manager using the at least one computer hardware platform, an influence factor for said first category based at least in part on a strength of relationships within said social network between said first user and said person in said first set of persons, wherein the strength of the relationships is based upon a variable scoring of the strength of the relationship;
    ranking said first set of persons based at least in part on said influence factor;
    providing the ranked first set of persons to at least one application operating on a computer system for consumption by the application;
    filtering or ranking, via the at least one application, the results of a query based on the ranked first set of persons to generate a customized set of search results; and
    presenting, via the at least one application, the customized set of search results in response to the query, wherein the preceding steps are performed by at least one computer processor.

2. The method of claim 1, said ranking being further calculated as a product of said reputation level and said influence factor for each of said persons in said first set of persons.

3. The method of claim 2, said determining a reputation level being performed prior to said receiving a request.

4. The method of claim 1 further comprising:
    searching a second social network of said first user to identify a second set of persons associated with said first category;
    for each person in said second set of persons:

determining a influence factor based at least in part on relationships within said second social network between said first person and said person in said first set of persons;
said ranking being based on a trust factor determined from said second social network.

5. The method of claim 1, said first set of persons comprising a plurality of levels of said social network.

6. The method of claim 5, said method being performed in an iterative fashion comprising expanding said first set of persons.

7. The method of claim 1 further comprising:
for each of said plurality of usage context:
searching a set of documents for a usage context to identify a plurality of persons associated with said usage context;
for each of said plurality of persons, determining the reputation level for a person based on said set of documents; and
storing said reputation level in a reputation database;
said first set of persons being selected from said reputation database.

8. A system comprising:
one or more computer systems, each computer system having at least one processor and one memory device;
the one or more computer systems configured to provide;
a reputation scorer operating on at least one of the computer systems, the reputation scorer, using the at least one computer system, searches for a first category to identify persons related to said first category and determines a reputation rating for said persons relating to said first category; and
an influencer analyzer operating on at least one of the computer systems, the influence analyzer, using the computer system, configured to:
search a social network for persons having said reputation rating for said first category;
determine a strength of a relationship between a first user and the identified persons, wherein the strength of the relationship is a variable strength of the relationship based upon an analysis of various relationships between the first user and the identified persons;
determine an influence score for said persons based at least in part on the determined strength of the relationship; and
rank said persons based in part on said influence score; and
an application operating on at least one of the computer systems, the application, using the computer system, configured to:
filter or rank the results of a query based on the ranked said persons to generate a customized set of search results; and
present the customized set of search results in response to the query.

9. The system of claim 8, said social network aggregator that further ranks said persons based at least in part on said reputation rating.

10. The system of claim 9, said reputation scorer that determines a reputation rating based on express actions performed by said persons.

11. The system of claim 10, said reputation scorer that further determines a reputation rating based on a reputation determination.

12. The system of claim 11, said reputation determination being determined by actions performed by other persons relating to said person for whom a reputation determination is being made.

13. The system of claim 12, said actions being feedback.

14. The system of claim 12, said actions comprising social network connections.

15. The system of claim 8, said social network aggregator that searches said social network to identify a minimum number of said persons.

16. The system of claim 8, said social network aggregator that searches a maximum number of nodes away from said user.

17. A method comprising:
receiving a plurality of categories;
for each of said plurality of categories:
searching a set of documents for a category to identify a plurality of persons associated with said category;
for each of said plurality of persons, determining by a computer system a reputation level for a person after searching online references for said person, said reputation level being based on explicit actions performed by said person and feedback performed by other persons relating to said person;
receiving a request comprising a first category and a first user;
searching a social network comprising said first user to identify a first set of persons having said reputation level associated with said first category;
for each person in said first set of persons:
determining by the computer system a trust factor based at least in part on a strength of relationships within said social network between said first person and said person in said first set of persons, wherein the strength of the relationship is a variable strength of the relationship based upon an analysis of various relationships between the first user and the identified persons;
ranking said first set of persons based at least in part on said trust factor;
providing the ranked first set of persons to at least one application for consumption by the application;
filtering or ranking, via the at least one application, the results of a query based on the ranked first set of persons to generate a customized set of search results; and
presenting, via the at least one application, the customized set of search results in response to the query, wherein the preceding steps are performed by at least one computer processor.

18. The method of claim 17, said ranking being further based in part on said reputation rating.

19. The method of claim 18, said first set of persons comprising both natural persons and organizational entities.

20. The method of claim 19, said social network comprising a plurality of social networks.

* * * * *